(12) United States Patent
Siliqi et al.

(10) Patent No.: US 8,144,543 B2
(45) Date of Patent: Mar. 27, 2012

(54) SEISMIC DATA PROCESSING METHOD FOR RMO PICKING

(75) Inventors: Risto Siliqi, Paris (FR); Philippe Herrmann, Villepreux (FR)

(73) Assignee: CGG Veritas SA, Massy Cedex (FR)

( * ) Notice: Subject to any disclaimer, the term of this patent is extended or adjusted under 35 U.S.C. 154(b) by 0 days.

(21) Appl. No.: 12/828,020

(22) Filed: Jun. 30, 2010

(65) Prior Publication Data

US 2010/0265798 A1 Oct. 21, 2010

Related U.S. Application Data

(63) Continuation of application No. 11/407,743, filed on Apr. 19, 2006, now Pat. No. 7,804,739.

(30) Foreign Application Priority Data

Apr. 19, 2005 (FR) ...................... 05 03882

(51) Int. Cl.
*G01V 1/36* (2006.01)
*G01V 1/28* (2006.01)
(52) U.S. Cl. ............................. 367/52; 367/51; 702/17
(58) Field of Classification Search ............. 367/51–53; 702/17
See application file for complete search history.

(56) References Cited

U.S. PATENT DOCUMENTS

| | | | |
|---|---|---|---|
| 3,731,269 A | 5/1973 | Judson et al. | |
| 3,735,337 A | 5/1973 | Widess | |
| 4,858,202 A | 8/1989 | Fitch et al. | |
| 4,980,866 A | 12/1990 | Wang et al. | |
| 5,128,899 A | 7/1992 | Boyd et al. | |
| 5,136,553 A | 8/1992 | Kelly et al. | |
| 5,157,638 A | 10/1992 | Loumos et al. | |
| 5,285,422 A | 2/1994 | Gonzalez et al. | |
| 5,570,321 A | 10/1996 | Bernitsas | |
| 5,761,062 A | 6/1998 | Chambers | |
| 6,546,339 B2 * | 4/2003 | Bevc et al. | ............ 702/18 |
| 6,839,658 B2 | 1/2005 | Causse | |
| 7,369,944 B2 * | 5/2008 | Herrmann et al. | ............ 702/17 |
| 7,804,739 B2 | 9/2010 | Siliqi et al. | |
| 2002/0042678 A1 | 4/2002 | Bevc et al. | |

(Continued)

FOREIGN PATENT DOCUMENTS

WO 2006/111545 A1 10/2006

OTHER PUBLICATIONS

Sarkar, D., et al.; "Migration Velocity Analysis in Factorized VTI Media"; Geophysics Soc. Exploration Geophysicists USA; vol. 69, No. 3, May 2004, pp. 708-718, XP002368949; ISSN: 0016-8033; p. 710, col. 2-p. 711, col. 1.

(Continued)

*Primary Examiner* — Ian Lobo
(74) *Attorney, Agent, or Firm* — Potomac Patent Group PLLC

(57) ABSTRACT

The invention relates to a method of processing seismic data, the said seismic data comprising a gather of seismic traces organized according to one or several acquisition parameters, comprising the steps of:
a) defining an equation for an RMO curve as a combination of elementary functions of the acquisition parameter(s),
b) determining an RMO curve from the equation of step (a) as a combination of orthogonal elementary functions
c) for a given time or at a given depth, determining the coefficients of the combination that optimize the semblance of traces along the RMO curve.

19 Claims, 4 Drawing Sheets

U.S. PATENT DOCUMENTS

Figure 1:
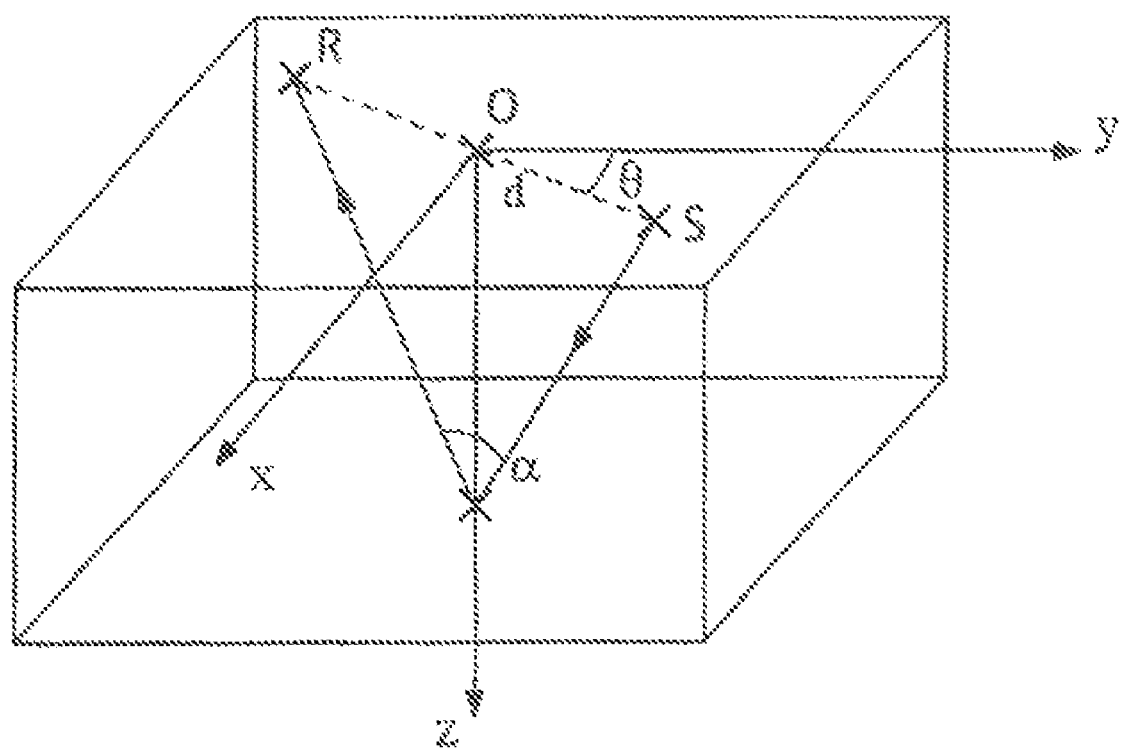

| | | |
|---|---|---|
| 2002/0049540 A1 | 4/2002 | Bevc et al. |
| 2003/0187583 A1 | 10/2003 | Martin et al. |
| 2004/0015296 A1 | 1/2004 | Causse et al. |
| 2005/0237857 A1 | 10/2005 | Jiao et al. |
| 2006/0250892 A1 | 11/2006 | Siliqi et al. |
| 2006/0253257 A1 | 11/2006 | Herrmann et al. |

OTHER PUBLICATIONS

International Search Report of the ISA dated Oct. 8, 2006 (2 pages).

D. Le Meur et al., "Pre Conditioning of the Densely Sampled Stacking Velocity Field" EAGE 64th Conference & Technical Exhibition, Florence Italy May 27-30, 2002.

Hans J. Tieman, "Migration Velocity Analysis: Accounting For The Effects of Lateral Velocity Variations" Geophysics, vol. 60, No. 1., Jan.-Feb. 1995, pp. 164-175.

L.T. Ikelle, "migration-Velocity Analysis For TI and Orthorhombic Background Media" Institut of Français du Pétrole, 1998, pp. 571-584.

Frank Adler et al., "Robust Estimation of Dense 3D Stacking Velocities From Automated Picking" CGG London UK, Seg 1999.

Moritz M. Fliedner et al., "Velocity Model Building by Wavefield-Continuation Imaging In The Deepwater Gulf of Mexico" The Leading Edge, Dec. 2002, pp. 1232-1236.

\* cited by examiner

SEISMIC DATA PROCESSING METHOD FOR RMO PICKING

CROSS-REFERENCE TO RELATED APPLICATIONS

This application is (1) based on and claims priority to French Application No. 0503882 filed on Apr. 19, 2005; and this application is (2) a continuation of U.S. application Ser. No. 11/407,743 filed on Apr. 19, 2006 now U.S. Pat. No. 7,804,739, both of which applications are hereby incorporated by reference for all purposes in their entirety and are assigned to the assignee of the present invention.

STATEMENT REGARDING FEDERALLY-SPONSORED RESEARCH OR DEVELOPMENT

N/A

NAMES OF THE PARTIES TO A JOINT RESEARCH AGREEMENT

N/A

REFERENCE TO SEQUENCE LISTING

N/A

BACKGROUND OF THE INVENTION

The invention relates to the field of processing data recorded for seismic imaging purposes.

The purpose of seismic imaging is to generate high-resolution images of the subsoil from acoustic reflection measurements.

Conventionally, in seismic exploration, a plurality of seismic sources and receivers is distributed on the ground surface at a distance from each other. The seismic sources are activated to produce seismic waves that travel through the subsoil. These seismic waves undergo deviations as they propagate. They are refracted, reflected and diffracted at the geological interfaces of the subsoil. Certain waves that have travelled through the subsoil are detected by seismic receivers and are recorded as a function of time in the form of signals (called traces). Recorded signals then have to be processed by a migration operation to obtain an image of underground geological structures. The migration operation consists of causing reflections recorded along the corresponding interfaces to converge.

During the processing, the stacking step consists of adding acoustic reflections derived from a same point in the subsoil. This step increases the signal to noise ratio and the amplitude ratio between primary and multiple reflections.

This is done by collecting traces into Common Image Gathers.

For example, assuming the subsoil is horizontally stratified with no lateral variation of acoustic velocities, those traces which illuminate the same point in the subsoil for variable source-receiver distances (offsets) are those with a common midpoint between the source and receiver.

This is why traces can be collected into gathers of Common Mid-Point traces.

However, waves reflected in the subsoil are recorded at arrival times that vary as a function of the offset. Therefore, before traces can be added, they have to be corrected to bring them to a common reference, namely the zero offset trace. This correction is made during a so-called Normal Move Out (NMO) correction step.

In general, it is considered that the time at which the same event is recorded varies as a function of the offset along a hyperbolic NMO curve that depends on the average wave propagation velocity in the subsoil. For each time at zero offset, an NMO curve is determined by successive approximations of the velocity and an evaluation of the semblance of traces along the corresponding curve. The determination of NMO curves provides a means of correcting traces so as to align reflections on all traces so that they can be stacked.

However, most of the time, the NMO correction is not sufficiently precise and distortions remain. An additional correction is made during a so-called Residual Move Out (RMO) step.

In general, it is assumed that the residual correction is of the parabolic type.

On this subject, reference is made to the publication <<Robust estimation of dense 3D stacking velocities from automated picking>>, Franck Adler, Simon Brandwood, 69th Ann. Internat. Mtg., SEG 1999, Expanded Abstracts. The authors suggest an RMO correction defined by the equation:

$$\tau(x,t) = x^2(V^{-2} - V_{ref}^{-2})/2t$$

where $\tau$ is the RMO correction, x is the offset; t is the time at zero offset, $V_{ref}$ is a reference velocity function and V is an updated speed.

However, seismic prospecting nowadays leads to the use of seismic sources and receivers at increasing distances from each other. As a result of longer offsets, RMO curves become more and more difficult to describe and the parabolic model has often been found unsatisfactory.

Furthermore, there is no model according to prior art that can describe RMO distortions as a function of the azimuth.

Furthermore, techniques according to prior art cannot be used to create a homogenous RMO picking in the acquisition space.

One purpose of the invention is to derive from recorded seismic data an evaluation of RMO distortions which is more precise than with prior art techniques.

There is provided in accordance with the invention a method of processing seismic data, the said seismic data comprising a gather of seismic traces organized according to one or several acquisition parameters, comprising the steps of:
  a) defining an equation for an RMO curve as a combination of elementary functions of the acquisition parameter(s),
  b) determining an RMO curve from the equation of step (a) as a combination of orthogonal elementary functions
  c) for a given time or at a given depth, determining the coefficients of the combination that optimize the semblance of traces along the RMO curve.

The method according to the invention can be used to make an RMO picking more precisely than with processes according to prior art. The method enables a picking of complex RMO curves and taking account of several acquisition parameters.

Thus, the method according to the invention can be used to obtain a finer description of RMOs distortions than is possible with processes according to prior art.

Furthermore, the process according to the invention is applicable to any type of gather of traces, particularly including multi-dimensional gathers, in other words gathers of seismic traces organized according to several acquisition parameters.

The process according to the invention can be used to obtain a multidimensional RMO characterization.

The process according to the invention may include one of the following characteristics:

the acquisition parameter(s) is (are) chosen from among the group of parameters consisting of the offset, azimuth angle, Incidence angle, source-receiver coordinates, step b) is done for a plurality of sampling times or depths, the method includes a step consisting off normalizing the following elementary functions, the elementary functions are polynomial or trigonometric functions, seismic data include a plurality of gathers of traces, steps a) and b) being done independently for each gather of traces, the process includes steps consisting of determining variations of coefficients as a function of the acquisition parameter(s) on a plurality of gathers of traces and filtering the coefficients.

The invention also relates to a software product for processing of seismic data, including a medium on which programming means are recorded to be read by a computer to control the computer so that it executes steps in the process preceding it.

Figure 2:
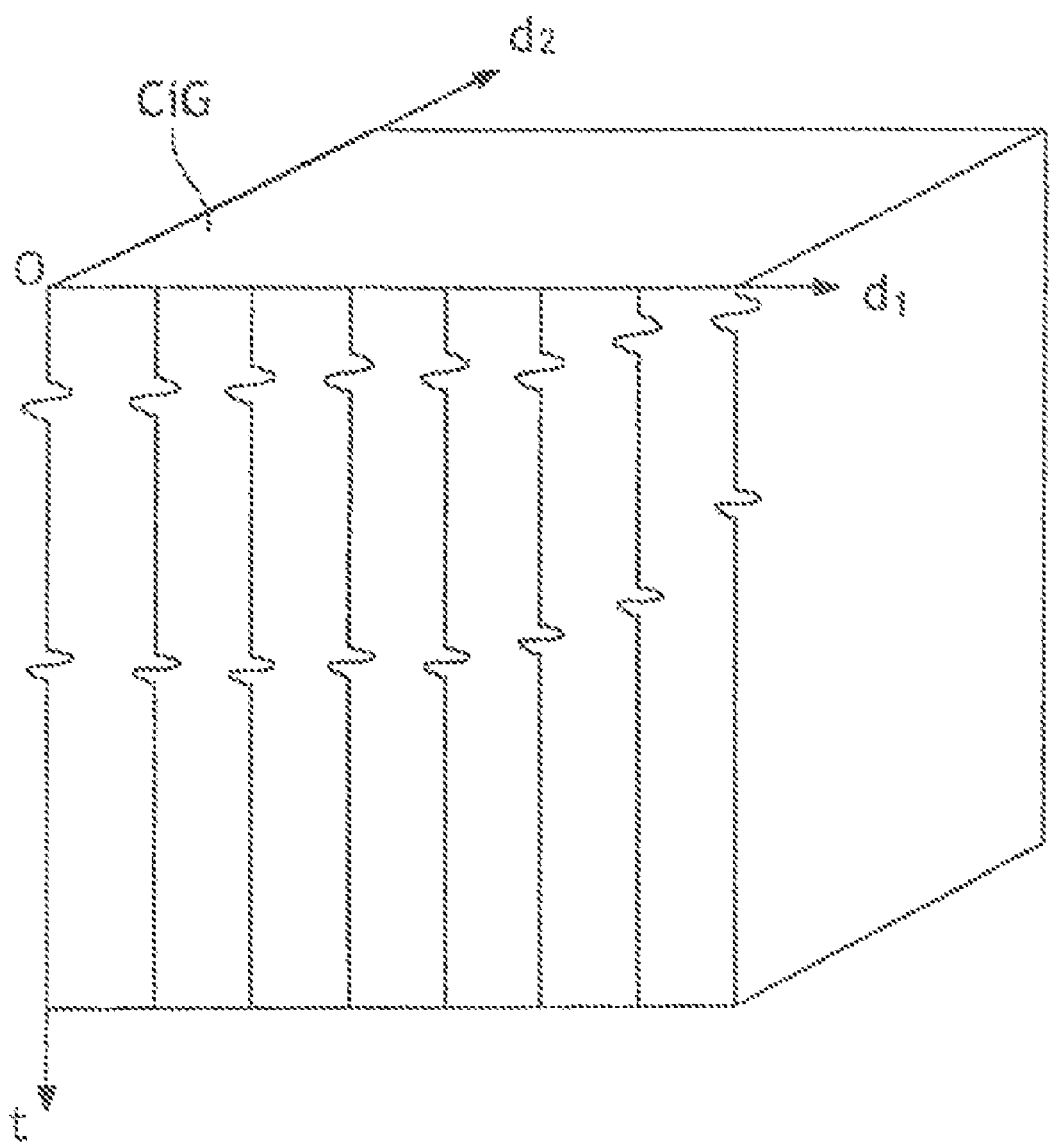
Figure 3:
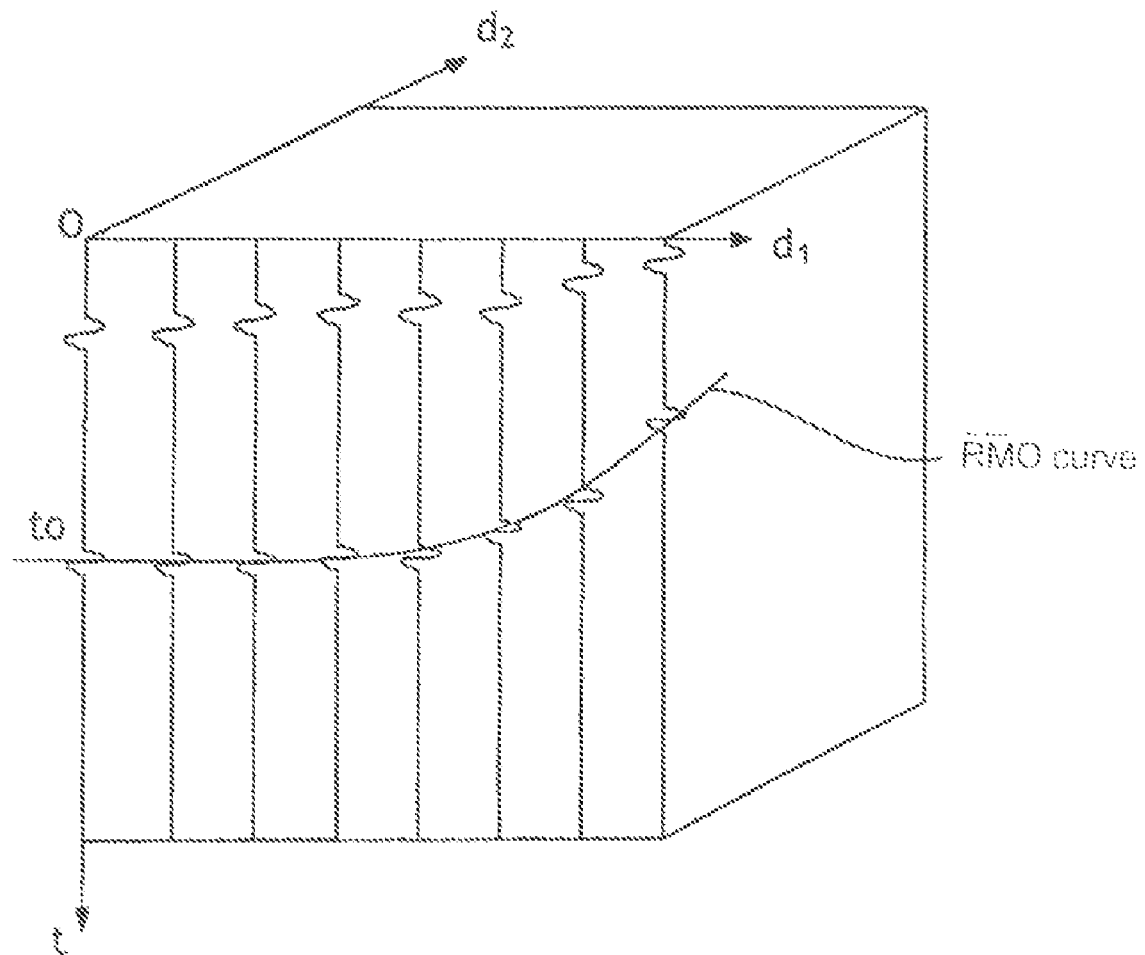
Figure 4:
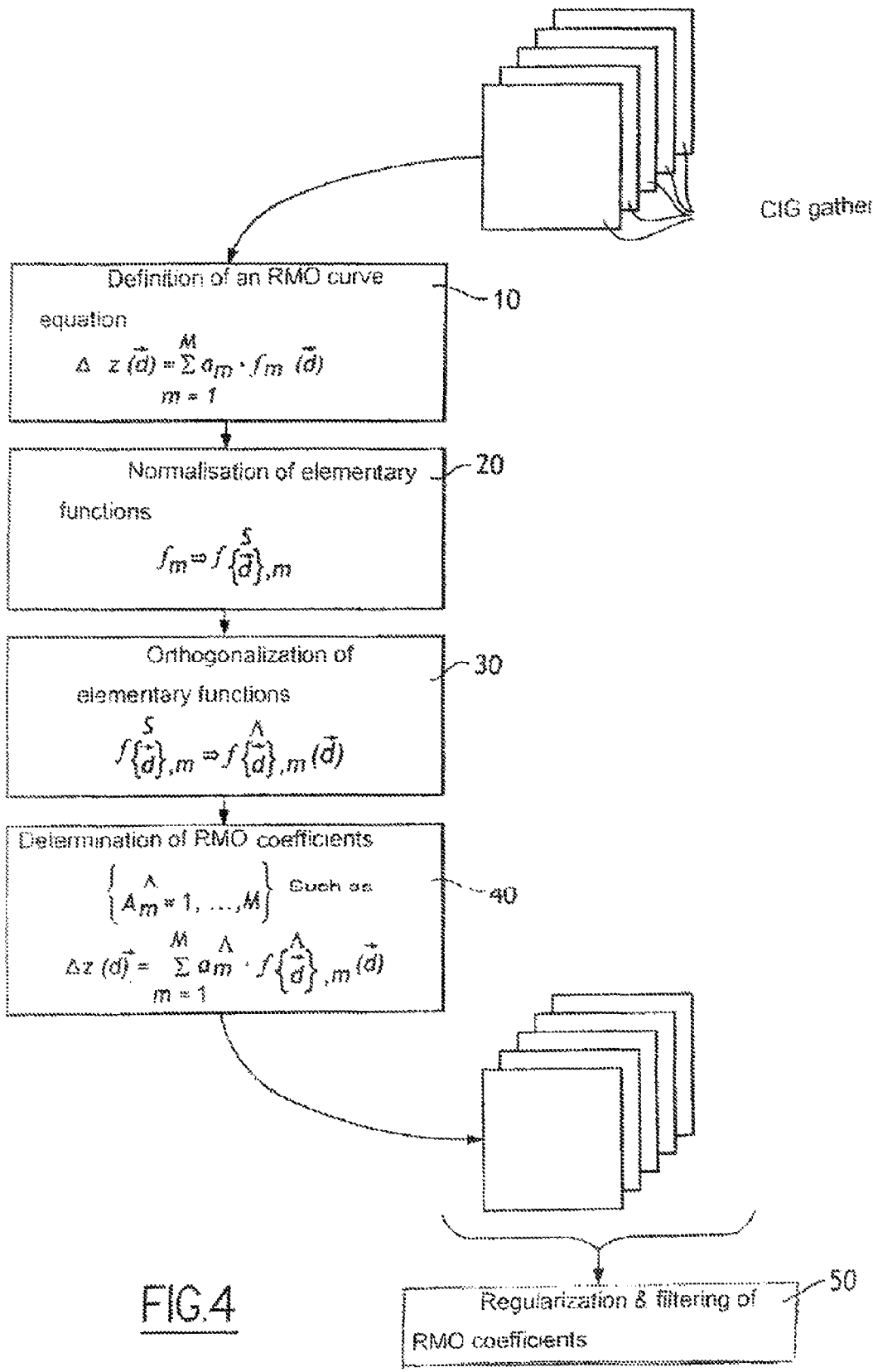

Other characteristics and advantages will become clear after reading the following description which is purely illustrative and is in no way limitative and should be read with reference to the attached drawings among which:

FIG. 1 diagrammatically shows paths of seismic waves travelling between source-receiver pairs with the same common midpoint, FIG. 2 diagrammatically shows a gather of traces (CIG) obtained after an NMO correction, FIG. 3 shows an RMO curve applied to the gather of traces in FIG. 2, FIG. 4 is a diagram showing the sequence of steps of a processing method according to one embodiment of the invention.

FIG. 1, shows a source S-receiver R pair placed on the ground surface. During a seismic acquisition, the source S is activated to generate a seismic wave that travels through the subsoil. The seismic wave is reflected at an interface and reaches receiver R. Receiver R records the amplitude of the wave that it receives during time. The record (or trace) obtained by the receiver R contains a signal corresponding to the reflection of the wave on the interface.

Note:

O is the midpoint between the source S and the receiver R, d is the distance between the source S and the receiver R, namely the offset, $(sr_x, sr_y)$ are the coordinates of the R-S segment at the ground surface, in an (O, x, y, z) coordinate system, $\theta$ is the azimuth angle of the R-S segment in the (O, x, y, z) coordinate system, $\alpha$ is the angle between the incident wave and the reflected wave at the reflection point (incidence angle).

It will be understood that a plurality of receivers are placed on the ground surface during a seismic acquisition.

FIG. 2 shows a CIG gather of seismic traces obtained after filtering and NMO correction. The gather contains a number N of traces. The traces are organized according to one or several acquisition parameters $d_1, d_2, \ldots d_n$.

For example, the traces may be grouped into a gather of traces with a common midpoint (CMP).

The acquisition parameters considered may he chosen from among the following parameters: offset d, azimuth angle $\theta$, incidence angle $\alpha$, source-receiver coordinates ($sr_x$, $sr_y$) or any other relevant parameters.

FIG. 3 shows the GIG gather on which a picking of an RMO curve has been completed at time $t_0$.

The method according to the invention creates RMO curve picking in each gather of a plurality of CIG gathers and for each sampling depth z.

According to one embodiment of the invention, the processing method includes the steps shown in FIG. 4.

The following steps are carried out for each CIG gather.

According to a first step 10, an equation with an RMO curve is defined as a linear combination of elementary functions.

$$\Delta z(\bar{d}) = \sum_{m=1}^{M} a_m \cdot f_m(\bar{d}) \quad [1]$$

where $\Delta z$ is the RMO variation, $(a_1, a_2, \ldots a_M)$ are the coefficients of the linear combination, $(f_1, f_2, \ldots f_M)$ are the elementary functions, $\bar{d} = (d_1, d_2 \ldots d_n)$ are the acquisition parameters considered, M is the dimension of the elementary functions base (M>2).

The dimension M of the decomposition base depends on the topological complexity of the required RMO curves. The increase in the dimension M increases the precision of the description of RMO distortions.

The expression of elementary functions $f_m$ depends on the organization of the CIG gather.

According to a first possibility, the traces are grouped into a common midpoint (CMP) gather as a function of the offset d. The elementary functions are suitably:

$$f_m(\bar{d}) = d^m \text{ with } m=0,\ldots,M \quad [2]$$

where $\bar{d}=d$. The combination of equation (1) is thus a polynomial.

It is noted for illustration purposes that in the case of seismic data based on compressional wave arrivals (P-waves), the combination only comprises even exponent terms, in other words coefficients $a_m$ where m is an odd number are zero.

According to a second possibility, the traces are grouped into a common midpoint (CMP) gather as a function of the offset d and the azimuth $\theta$. The elementary functions can then be defined as follows:

$$f_m^p(\bar{d}) = d_1^{m-p} d_2^p \text{ with } m=1,\ldots,M \text{ and } p=0,\ldots,m \quad [3]$$

where $\bar{d} = (d_1, d_2) = (sr_x, sr_y)$.

According to a third possibility, the traces are grouped into a common midpoint (CMP) gather as a function of the incidence angle $\alpha$. Elementary functions can then be defined as follows:

$$f_m(\bar{d}) = \tan(d)^m \text{ with } m=1,\ldots,M \quad [4]$$

where $\bar{d} = d = \theta$.

According to a second step 20, the elementary functions $f_m$ are normalised according to the sampling $\{\bar{d}_{n=1,\ldots m}\}$ in the CIG gather. Thus, the normalized elementary functions are defined as follows:

$$f^S_{\{\bar{d}\}},m(\bar{d}_n) = f_m(\bar{d}_n) \Big/ \sqrt{\sum_{k=1}^{N} f^2_m(\bar{d}_k)} \qquad [5]$$

where
$f_{\{\bar{d}\}}^S,m$ is the normalised elementary function $f_m$,
k is a trace of the CIG gather,
N is the number of traces in the CIG gather.
This step may be expressed in matrix form as follows:

$$F_{\{\bar{d}\}}^S = F \cdot S_{\{\bar{d}\}} \qquad [6]$$

where $F_{\{\bar{d}\}}^S$ is a matrix with dimensions N×M, defined as $F_{\{\bar{d}\}}^S = (\bar{f}_{\{\bar{d}\}}^S 1, \ldots, \bar{f}_{\{\bar{d}\}}^S M)$, [7]

F is a matrix with dimensions N×M defined by F= $(\bar{f}_1, \ldots \bar{f}_M)$ where $$\bar{f}_{m=1,\ldots M} = (f_m(\bar{d}_1), \ldots, f_m(\bar{d}_N))^T \qquad [8]$$

$S_{\{\bar{d}\}}$ is a diagonal normalisation matrix with dimensions M×M defined by $$s_{\{\bar{d}\}i,j(\neq i)} = 0 \text{ and } s_{\{\bar{d}\}m,m} = 1 \Big/ \sqrt{\sum_{k=1}^{N} f^2_m(\bar{d}_k)} \qquad [9]$$

The purpose of the normalisation step 20 is to define the principal search directions for the NMO curve independent of the sampling distribution of acquisition parameters $d_1$, $d_2, \ldots d_n$.

According to a third step 30, the elementary functions are orthogonalized. Thus, orthogonal elementary functions are defined $\{f_{\{\bar{d}\}m=1,\ldots M}^{79}\}$. This is done by making a breakdown of the matrix $(F_{\{\bar{d}\}}^S)^T \cdot F_{\{\bar{d}\}}^S$ into singular values (SVD) such that $$((F_{\{\bar{d}\}}^S)^T \cdot F_{\{\bar{d}\}}^S = U_{\{\bar{d}\}} \cdot \Lambda_{\{\bar{d}\}} \cdot U_{\{\bar{d}\}}^T \qquad [10]$$

where
$U_{\{\bar{d}\}}$ is a rotation matrix with dimensions M×M formed from M eigenvectors $\bar{e}_{\{\bar{d}\}m=1,\ldots,M}$ of the matrix $(F_{\{\bar{d}\}}^S)^T \cdot F_{\{\bar{d}\}}^S$.

$$U_{\{\bar{d}\}} = (\bar{e}_{\{\bar{d}\}1},\ldots,\bar{e}_{\{\bar{d}\}M}) \qquad [11]$$

$$U_{\{\bar{d}\}}^T \cdot U_{\{\bar{d}\}} = I = \begin{pmatrix} 1 & 0 & 0 \\ 0 & \ddots & 0 \\ 0 & 0 & 1 \end{pmatrix} \qquad [12]$$

$\Lambda_{\{\bar{d}\}}$ is a diagonal matrix with dimensions M×M containing eigenvalues $\lambda_{\{\bar{d}\}m=1,\ldots,M}$ $$\Lambda_{\{\bar{d}\}} = \begin{pmatrix} \lambda_{\{\bar{d}\}1} & 0 & 0 \\ 0 & \ddots & 0 \\ 0 & 0 & \lambda_{\{\bar{d}\}M} \end{pmatrix} \qquad [13]$$

The normalisation step 20 that precedes step 30 limits the variability of eigenvalues related to sampling conditions $\{\bar{d}\}$ in the CIG gather of traces. Regardless of the sampling conditions, we get:

$$\sum_{i=1}^{M} \lambda_{\{\bar{d}\}i} = M, \forall \{\bar{d}\} \qquad [14]$$

The normalisation step 20 also reduces the variability of eigenvectors related to sampling conditions $\{\bar{d}\}$ in the CIG gather of traces. For two given sampling conditions $\{\bar{d}\}_1$ and $\{\bar{d}\}_2$, we have:

$$U_{\{\bar{d}\}_1}^T \cdot U_{\{\bar{d}\}_2} \approx 1 \qquad [15]$$

Starting from relations [10] and [6], we have:

$$(F_{\{\bar{d}\}}^S \cdot U_{\{\bar{d}\}})^T \cdot (F_{\{\bar{d}\}}^S \cdot U_{\{\bar{d}\}}) = \Lambda_{\{\bar{d}\}} \qquad [16]$$

$$(F_{\{\bar{d}\}} \cdot S_{\{\bar{d}\}} \cdot U_{\{\bar{d}\}})^T \cdot (F_{\{\bar{d}\}} \cdot S_{\{\bar{d}\}} \cdot U_{\{\bar{d}\}}) = \Lambda_{\{\bar{d}\}} \qquad [17]$$

A matrix of RMO distortion approximations can be obtained using:

$$F_{\{\bar{d}\}}^\wedge = F_{\{\bar{d}\}} \cdot S_{\{\bar{d}\}} \cdot U_{\{\bar{d}\}} = (\bar{f}_{\{\bar{d}\}}^\wedge 1, \ldots, \bar{f}_{\{\bar{d}\}}^\wedge M)^T \qquad [18]$$

where $$F_{\{\bar{d}\}m}^\wedge(\bar{d}) = \sum_{k=1}^{M} \bar{e}_{k,m} \cdot f_{\{\bar{d}\}k}^S(\bar{d}) \text{ with } m = 1, \ldots, M \qquad [19]$$

By construction, we have:

$$(\bar{f}_{\{\bar{d}\}}^\wedge i)^T \bar{f}_{\{\bar{d}\}}^\wedge j = 0, \text{ for } i \neq j \qquad [20]$$

$$(\bar{f}_{\{\bar{d}\}}^\wedge i)^T \bar{f}_{\{\bar{d}\}}^\wedge i = \lambda_i \qquad [21]$$

As a function of the decomposition base used to define the RMO curve, we obtain:

$$\overline{\Delta z} = F \cdot \bar{a} = F_{\{\bar{d}\}}^S \cdot \bar{a}_{\{\bar{d}\}}^S = F_{\{\bar{d}\}}^\wedge \cdot \bar{a}_{\{\bar{d}\}}^\wedge \qquad [22]$$

where $$\overline{\Delta z} = (\Delta z(\bar{d}_1), \ldots, \Delta z(\bar{d}_N)) \qquad [23]$$

$$\bar{a} = (a_1, \ldots, a_M)^T \qquad [24]$$

$$\bar{a}_{\{\bar{d}\}}^S = (a_1^S, \ldots, a_M^S)^T \qquad [25]$$

$$\bar{a}_{\{\bar{d}\}}^\wedge = (a_1^\wedge, \ldots, a_M^\wedge)^T \qquad [26]$$

Hence:

$$\bar{a} = (F_{\{\bar{d}\}}^T \cdot F_{\{\bar{d}\}})^{-1} \cdot F_{\{\bar{d}\}}^T \cdot F_{\{\bar{d}\}}^\wedge \cdot \bar{a}_{\{\bar{d}\}}^\wedge = S_{\{\bar{d}\}} \cdot U_{\{\bar{d}\}} \cdot \bar{a}_{\{\bar{d}\}}^\wedge \qquad [27]$$

$$\bar{a}_{\{\bar{d}\}}^\wedge = U_{\{\bar{d}\}}^T \cdot S_{\{\bar{d}\}}^{-1} \cdot \bar{a} \qquad [28]$$

According to a fourth step 40, picking of the RMO curve is completed for each sampling depth z (or reference time). This is done by determining a series of coefficients $\{a_{m=1,\ldots,M}^\wedge\}$ to optimize the semblance of traces along the RMO curve.

The RMO curve is defined in the orthogonal elementary functions base by:

$$\overline{\Delta z}(\bar{d}) = F_{\{\bar{d}\}}^\wedge \cdot \bar{a}_{\{\bar{d}\}}^\wedge \qquad [29]$$

The coefficients are determined by iteration so as to maximise the semblance of traces along the RMO curve.

An example parameter can be used to measure semblance along the RMO curve, as follows:

$$S(a_{m=1 \ldots m}^{\Lambda}) = \frac{\left(\sum_{i=1}^{N} A_i\right)^2}{\sum_{i=1}^{N} A_i^2} \quad [30]$$

where $A_i$ is the amplitude value of the trace i along the RMO curve.

The value of the semblance S thus determined is between 0 and 1.

Steps 10, 20, 30 and 40 are carried out Independently for each CIG gather of traces among the plurality of gathers and for each sampled depth z.

According to a fifth step 50, a variation of coefficients $\{a_{m=1}, \ldots, M^{\Lambda}\}$, is determined on the set of gathers in the plurality of CIG gathers.

Due to the orthogonality of elementary functions $F_{\{\bar{d}\}m}^{\Lambda}$, each coefficient $a_m^{\Lambda}$ may be filtered independently of the other coefficients.

The reliability of the RMO curve or in an equivalent manner the signal to noise ratio associated with each $a_{m=1, \ldots, M}^{\Lambda}$ coefficient depends on the following conditions:

a) the CIG fold, in other words the number of acquired traces, and the noise associated with each trace, b) the distribution of acquisition parameters $\bar{d}=(d_1, d_2 \ldots d_n)$ within the CIG gather, c) the signal to noise ratio of the CIG gather.

In practice, conditions a), b) and c) vary from one gather of traces to another, and from one depth to the other. Consequently, the $a_{\{\bar{d}\}m=1, \ldots, M}^{\Lambda}(x, y, z)$ coefficients are contaminated by some unwanted high-frequency noise components. In order to spatially stabilize the automatic determination of the RMO curve, scale factors must be regularised and filtered. This is done by firstly projecting RMO curves on a reference sampling grid CIG with a reference sampling configuration $\{\bar{d}_R\}$ according to:

$$\Delta z(\bar{d}_R) = \sum_{m=1}^{M} a_m^{\Lambda} \cdot f_m^{\Lambda}(\bar{d}_R) \quad [31]$$

which leads to the following relation:

$$\bar{a}_{\{\bar{d}_R\}}^{\Lambda} = U_R^T \cdot S_R^{-1} \cdot S \cdot U \cdot \bar{a}_{\{\bar{d}\}}^{\Lambda} \quad [32]$$

The spatial continuity on each coefficient $a_{\{\bar{d}_R\}m}^{\Lambda}(x, y, z)$ can then be reinforced independently, since by construction these coefficients are not correlated. The precise description of RMO curves has many applications including:

updating of effective velocity models in time imaging: NMO (Normal MoveOut), DMO (Dip MoveOut), Pre-STM (Pre-Stack Time Migration), updating of the interval velocity model in depth imaging, optimum stacking of image gathers (CIG), an AVO (Amplitude Versus Offset) and AVA (Amplitude Versus Angle) analysis, characterization of azimuth anisotropy.

The method can be used to obtain a description from a gather of traces in a single pass, in other words without it being necessary to split the gather into offset slices, scatter angle slices or azimuth sectors.

This approach provides a robust and precise RMO picking method.

The RMO picking is optimized regardless of CIG gather sampling conditions.

Data management is thus facilitated. In particular, the single pass approach provides a means of reducing the steps of setting parameters for data for processing purposes.

The process is applicable to any type of trace gather, including multidimensional gathers, for example such as multi-azimuth gathers. The method enables a multidimensional RMO picking (for example two-dimensional or three-dimensional picking).

The invention claimed is:

1. A method of processing seismic data comprising a gather of seismic traces organized according to one or several acquisition parameters, each seismic trace being a time dependent amplitude signal and being associated with a given position on the ground zone over which the acquisition has been carried out, the method comprising the steps of:

determining with a computer a residual move-out (RMO) curve by picking in the gather of seismic traces;

defining an equation for the RMO curve, as a combination of elementary functions of the acquisition parameter(s);

orthogonalizing the elementary functions to determine an RMO curve as a combination of orthogonal elementary functions;

for a given time or at a given depth, determining the coefficients of the combination that optimize the semblance of traces along the RMO curve; and processing the seismic traces in view of these coefficients and generating an image of underground geological structures corresponding to the gather of seismic traces.

2. A method according to claim 1, in which the acquisition parameter(s) is (are) chosen from among the group of parameters consisting of the offset, azimuth angle, incidence angle, source-receiver coordinates.

3. A method according to claim 1, in which the step of determining the coefficients is completed for a plurality of sampling times or depths.

4. A method according to claim 1, in which the step of orthogonalizing includes a step of normalizing the elementary functions.

5. A method according to claim 1, in which the elementary functions are polynomial functions.

6. A method according to claim 1, in which the elementary functions are trigonometric functions.

7. A method according to claim 1, wherein the seismic data include a plurality of gathers of traces, in which all the steps are carried out independently for each gather of traces.

8. A method according to claim 7, including the steps of determining variations of the coefficients as a function of the acquisition parameter(s) on a plurality of gathers of traces and filtering the coefficients.

9. A method of processing seismic data comprising a common mid-point gather organized in accordance with an offset (d), the method comprising the steps of:

defining an equation for a residual move-out (RMO) curve as a linear combination of elementary functions of the offset of the form $f_m(d)=d^m$, where $f_m$ is an elementary function and m is a number between zero and M, with M being a dimension of the elementary functions;

orthogonalizing with a computer the elementary functions to determine an RMO curve as a combination of orthogonal elementary functions; and for a given time or at a given depth, determining the coefficients of the combination that optimize the semblance of traces along the RMO curve and generating an image of underground geological structures corresponding to the common mid-point gather.

10. A method of processing seismic data comprising a common mid-point gather organized in accordance with an offset (d), the method comprising the steps of:
defining an equation for an RMO curve as a linear combination of elementary functions of the offset of the form $f_m(d)=d^m$, where $f_m$ is an elementary function and m is a number between zero and M, with M being a dimension of the elementary functions;
normalizing and orthogonalizing with a computer the elementary functions to determine an RMO curve as a combination of orthogonal elementary functions; and
for a given time or at a given depth, determining the coefficients of the combination that optimize the semblance of traces along the RMO curve and generating an image of underground geological structures corresponding to the common mid-point gather.

11. A method of processing seismic data comprising a gather of seismic traces organized according to one or several acquisition parameters, each seismic trace being a time dependent amplitude signal and being associated with a given position on the ground zone over which the acquisition has been carried out, the method comprising the steps of:
receiving the seismic data from a sensor;
determining, based on the received seismic data from the sensor, a residual move-out (RMO) curve by picking in the gather of seismic traces;
defining an equation for the RMO curve, as a combination of elementary functions of the acquisition parameter(s);
orthogonalizing the elementary functions to determine an RMO curve as a combination of orthogonal elementary functions;
for a given time or at a given depth, determining the coefficients of the combination that optimize the semblance of traces along the RMO curve; and
processing the seismic traces in view of these coefficients curve and generating an image of underground geological structures corresponding to the gather of the seismic traces.

12. The method according to claim 11, in which the acquisition parameter(s) is (are) chosen from among the group of parameters consisting of the offset, azimuth angle, incidence angle, source-receiver coordinates.

13. The method according to claim 11, in which the step of determining the coefficients is completed for a plurality of sampling times or depths.

14. The method according to claim 11, in which the step of orthogonalizing including prior to orthogonalizing the step of normalizing the elementary functions.

15. The method according to claim 11, in which the elementary functions are polynomial functions.

16. The method according to claim 11, in which the elementary functions are trigonometric functions.

17. The method according to claim 11, wherein seismic data include a plurality of gathers of traces, in which the steps are carried out independently for each gather of traces.

18. The method according to claim 17, further comprising the steps of determining variations of the coefficients as a function of the acquisition parameter(s) on a plurality of gathers of traces and filtering the coefficients.

19. A method of processing seismic data comprising a common mid-point gather organized in accordance with an offset (d), the method comprising the steps of:
receiving the seismic data from a sensor;
determining the common mid-point gather based on the received seismic data;
defining an equation for a residual move-out (RMO) curve as a linear combination of elementary functions of the offset of the form $f_m(d)=d^m$, where $f_m$ is an elementary function and m is a number between zero and M, with M being a dimension of the elementary functions;
orthogonalizing the elementary functions to determine an RMO curve as a combination of orthogonal elementary functions; and
for a given time or at a given depth, determining the coefficients of the combination that optimize the semblance of traces along the RMO curve and generating an image of underground geological structures corresponding to the common mid-point gather.

* * * * *

UNITED STATES PATENT AND TRADEMARK OFFICE
CERTIFICATE OF CORRECTION

PATENT NO. : 8,144,543 B2
APPLICATION NO. : 12/828020
DATED : March 27, 2012
INVENTOR(S) : Siliqi et al.

It is certified that error appears in the above-identified patent and that said Letters Patent is hereby corrected as shown below:

In Column 5, Line 41, delete "$\{f_{\{\vec{d}\}_{m=1,\ldots,M(\vec{d})}}^{79}\}$" and insert -- $\{f_{\{\vec{d}\}_{m=1,\ldots,M}}(\vec{d})\}$ --, therefor.

In Column 5, Line 44, in Equation [10], delete "$((F_{\{\vec{d}\}}^{S})^{T}$" and insert -- $(F_{\{\vec{d}\}}^{S})^{T}$ --, therefor.

Signed and Sealed this
Seventeenth Day of July, 2012

David J. Kappos
*Director of the United States Patent and Trademark Office*